Patented May 9, 1933

1,907,493

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

INSECTICIDE

No Drawing.   Application filed July 3, 1930. Serial No. 465,652.

The present invention relates to insecticides and more particularly to a compound that possesses distinct insecticidal and fungicidal properties.

In the control of insects harmful to vegetation, such as aphides, spiders, psyllæ, etc., the use of nicotine and pyrethrum is well known, but the supply of these materials being commercially limited, and, consequently, expensive to obtain, their use is largely confined to conditions where cost is a secondary consideration. It has been proposed to replace the above compounds as insecticides with dinitro-ortho-cresol and/or the sodium salt thereof, which, although somewhat effective as insect exterminators, were found to burn and seriously injure the foliage of trees and plants to which the same had been applied. The danger due to explosion when allowed to dry has also made its use impractical. I have now discovered that dinitro-ortho-phenylphenol of the general formula;

or salts thereof, e. g. alkali or alkaline earth metal salts, as well as compounds thereof with organic nitrogen bases, such as aniline, butyl pyrrolidine, etc., are highly advantageous and capable materials for use as insect destroyers and may be safely applied to the foliage of trees and plants in the usual manner. I have also found the foregoing compounds to possess the additional property of being effective fungicides. The invention, accordingly, consists of the ingredients hereinafter fully described and particularly pointed out in the claims, the following description setting forth but several of various combinations of such ingredients which are satisfactory for the purpose stated and are contemplated as coming within the scope of the invention.

Various methods for the preparation of compounds of the type in question are known. A method for such preparation wherein ortho-phenylphenol is nitrated by means of a mixture of glacial acetic acid and nitric acid is set forth in Ann. 312; 226. The more general method, however, consists in heating a mixture of ortho-phenylphenol with an excess of 95 per cent sulphuric acid to form the sulphonic acid thereof and after diluting, further treating said mixture with dilute nitric acid, thereby splitting off the sulphonic group and forming the dinitro derivative of said phenol which precipitates out as yellowish white crystalline leaflets, and which is readily reacted upon by bases such as $NaOH$, $KOH$, $Na_2CO_3$, $Ca(OH)_2$ etc., to form the corresponding alkaline or alkaline earth metal salts. These salts are only slightly soluble in water, but dissolve readily in an organic solvent such as alcohol or ether. Aniline, butyl pyrrolidine, pyridine, nicotine, and numerous organic nitrogen bases also react with dinitro-ortho-phenylphenol, the salt thereof being obtained as a result.

In employing these compounds as insecticides and fungicides, particular reference is made to the control of aphides, spiders, and apple psylla, fungus, etc., on trees and plants in both the dormant condition as well as upon the foliage thereof. A suitable spray is made up by mixing 1 to 3 pounds of dinitro-ortho-phenylphenol in 100 gallons of water to form a suspension which may conveniently be used in varying concentrations, with or without a dispersion agent as conditions may determine, or in conjunction with other insecticidal or fungicidal agent, such as lime sulphur, lead arsenate, oil emulsion, oleates, etc., or organic nitrogen bases such as pyridine, alkaloids and similar compounds, if desired. It is noted that the compounds or mixture of compounds that may be used in conjunction with the materials that form the substance of this disclosure, may alone, or when so employed possess distinct insecticidal and plant disease destroying properties. As a dormant spray a stronger suspension may be used and thereby not only are the insects killed upon the trees or plants to which the spray is applied, but their eggs are so affected that the insects therefrom expire soon after hatching. When used with lime sulphur solution as a dormant spray, 1 to 2 pounds of the sodium salt or dinitro-ortho-phenylphenol mixed with 100 gallons of said solution is sufficient to assure a superior result in effecting a practically complete kill of aphides, psyllæ, red spiders, caterpillars, etc. Molds and other fungus growths are also killed and the sprayed plant surfaces are left clean and in a healthy condition. Such a spraying suffices for the first season of use and the results are evident over much of the following year. When sprayed upon the foliage of trees and plants an equally effective result is obtained without injury thereto. A weaker suspension may be used in this instance, less than 1 pound per 100 gallons of water or soap solution being found sufficient. The soap solution used may contain ½ to 2 pounds of soap per 100 gallons of solution. The usual spray equipment is suitable to be used in applying my spray or spray mixture. Other ways of using my insecticide will be evident to one skilled in the art.

In further describing my invention, dinitro-ortho-phenylphenol or the sodium salt thereof will be employed. Although many of the compounds of this type are known to be dangerous to handle when dried or otherwise treated, the compounds comprising my invention are, however, completely safe both to handle and to use. The precautions to be taken are only those that are ordinarily exercised in applying or compounding insecticides or in handling organic materials of this type. Dinitro-ortho-phenylphenol has a melting point of 205° to 206° C. and forms a suspension in water. The sodium salt, although somewhat insoluble in water, may be made up into a suspension suitable for practical application as a plant or tree spray. Various metallic salts such as $Pb(NO_3)_2$, $CuCl_2$, $Zn(NO_3)_2$, etc., may also be reacted with a solution of the sodium salt to form the corresponding organic metallic salts, which are effective plant disease control materials, and may be applied similarly to the other compounds comprising my invention. By a dinitro-ortho-phenylphenol compound is meant the compounds of that name that are characterized by the aforesaid general formula hereinbefore given, and also the resulting phenol compounds obtained from reacting said dinitro-ortho-phenylphenols with bases of alkali or alkaline earth metals, organic nitrogen bases, etc., or mixtures of the same, respectively.

The manufacture of the ortho-phenylphenol to be used in making the compounds embodying my invention is obviously not relevant to this disclosure, but it is noted that the presence of small quantities of the meta- and para-compound therein when reacted to make the compounds in question are not objectionable in my insecticide. The decreased cost of compounds of only approximate purity makes their use the more practicable. In the foregoing I have described an insecticide and fungicide compound that may be produced at low cost and in quantity. I have also shown the use of my insecticide and fungicide in controlling aphides and other similar sucking insects, spiders, the apple psylla, etc. and fungus such as molds and other harmful growths of this nature, on plants and trees, and I thereby provide a satisfactory substitute for nicotine, pyrethrum and similar materials for the purpose specified.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. An insecticide comprising a dinitro-ortho-phenylphenol compound.

2. An insecticide comprising dinitro-ortho-phenylphenol.

3. An insecticide comprising a salt of dinitro-ortho-phenylphenol.

4. An insecticide comprising the sodium salt of dinitro-ortho-phenylphenol.

5. As a new insecticide and fungicide, a mixture comprising at least one of the substances included in the group consisting of dinitro-phenylphenol and its salts.

6. As an insecticide and fungicide, a mixture comprising at least one of the substances included in the group consisting of dinitro-ortho-phenylphenol and the alkali metal, alkaline earth metal, lead, copper, zinc, aniline, butyl pyrrolidine, and alkaloidal salts of dinitro-ortho-phenylphenol.

7. A plant disease control agent comprising the reaction product of a dinitro-ortho-phenylphenol with an organic nitrogen base.

8. A plant disease control agent comprising the reaction product of dinitro-ortho-phenylphenol with an alkaloid.

9. A plant disease control agent comprising the reaction product of dinitro-ortho-phenylphenol with aniline.

10. A plant disease control spray comprising a mixture of a salt of dinitro-ortho-phenylphenol, and a dispersing agent.

11. A plant disease control spray consisting of dinitro-ortho-phenylphenol and an aqueous medium.

12. A plant disease control spray consisting of dinitro-ortho-phenylphenol and a soap emulsion.

13. An insecticide consisting of an aqueous medium, the sodium salt of dinitro-ortho-phenylphenol, and a dispersing agent.

14. A plant disease control spray comprising an aqueous colloidal solution which contains dinitro-ortho-phenylphenol in suspension therein, along with an emulsifying agent.

Signed by me this 26 day of June, 1930.

EDGAR C. BRITTON.